United States Patent
Kobayashi et al.

[11] Patent Number: 5,292,267
[45] Date of Patent: Mar. 8, 1994

[54] CONNECTOR UNIT WITH MOVABLE CONNECTOR

[75] Inventors: Takaichi Kobayashi, Itsukaichi; Kazuya Shibasaki, Hamura; Takashi Hosoi; Masami Honda, both of Oome; Kazuyoshi Takahashi, Tama, all of Japan

[73] Assignees: Kabushiki Kaisha Toshiba, Kawasaki; KEL Corporation, Tokyo, both of Japan

[21] Appl. No.: 40,583

[22] Filed: Mar. 31, 1993

Related U.S. Application Data

[60] Continuation of Ser. No. 777,593, Oct. 16, 1991, abandoned, which is a division of Ser. No. 627,738, Dec. 14, 1990, Pat. No. 5,182,698.

[30] Foreign Application Priority Data

| Dec. 15, 1989 | [JP] | Japan | 1-144810[U] |
| Feb. 12, 1990 | [JP] | Japan | 2-31207 |
| Apr. 13, 1990 | [JP] | Japan | 2-98441 |
| Nov. 29, 1990 | [JP] | Japan | 2-333055 |

[51] Int. Cl.⁵ .................................. H01R 13/629
[52] U.S. Cl. .................... 439/310; 439/247; 439/378; 439/567; 439/926; 439/928
[58] Field of Search ............. 439/157, 296, 310, 372, 439/247, 248, 567, 378, 926, 928; 361/391, 394, 395, 399

[56] References Cited

U.S. PATENT DOCUMENTS

| D. 276,342 | 11/1984 | Kitai | D14/111 |
| 3,014,160 | 12/1961 | Brogden | 439/296 |
| 3,440,594 | 4/1969 | Hopp et al. | 439/567 |
| 4,030,797 | 6/1977 | Nieman | 439/248 |
| 4,654,818 | 3/1987 | Wetterau, Jr. | 364/704 |
| 4,769,764 | 9/1988 | Levanon | 364/708 |
| 4,780,090 | 10/1988 | Sugiyama et al. | 439/247 |
| 4,788,658 | 11/1988 | Hanebuth | 364/708 |
| 4,843,477 | 6/1989 | Mizutani et al. | 361/391 |
| 4,898,541 | 2/1990 | Lhuillier | 439/248 |

FOREIGN PATENT DOCUMENTS

| 51-77033 | 6/1976 | Japan . |
| 53-29057 | 7/1978 | Japan . |
| 54-96546 | 7/1979 | Japan . |
| 55-100236 | 7/1980 | Japan . |
| 57-17041 | 1/1982 | Japan . |
| 58-44647 | 3/1983 | Japan . |
| 60-170831 | 11/1985 | Japan . |
| 62-30096 | 8/1987 | Japan . |
| 2169153 | 7/1986 | United Kingdom | 439/310 |

*Primary Examiner*—Neil Abrams
*Attorney, Agent, or Firm*—Oblon, Spivak, McClelland, Maier & Neustadt

[57] ABSTRACT

A function expanding apparatus for electronic devices having a mechanism for supporting a connector body. Two elastic members hold a connector body which is freely slidable between the two elastic members. The connector body is movable in multiple directions so as to connect to the electronic apparatus.

15 Claims, 14 Drawing Sheets

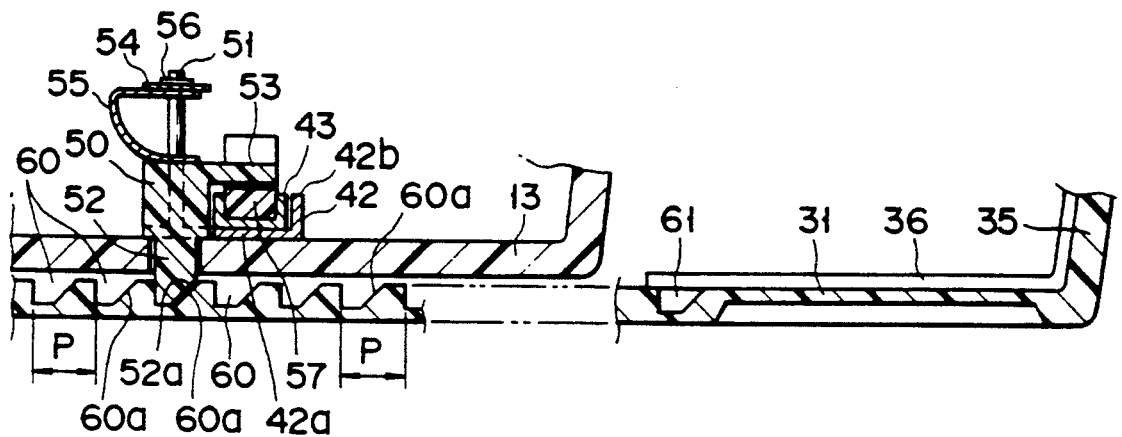
F I G. 9
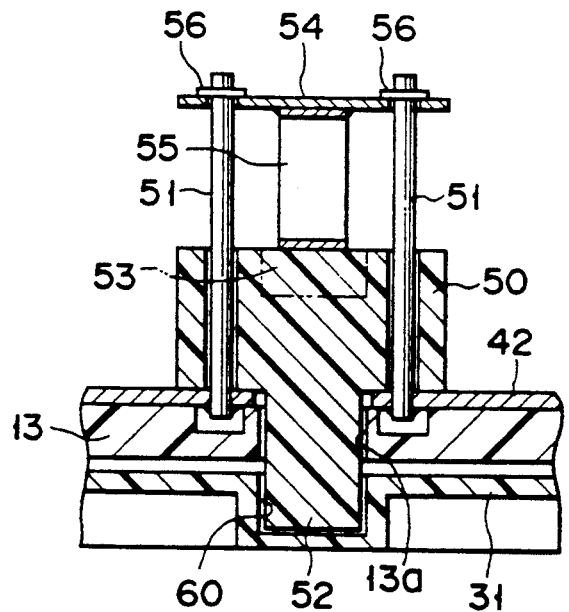
F I G. 10

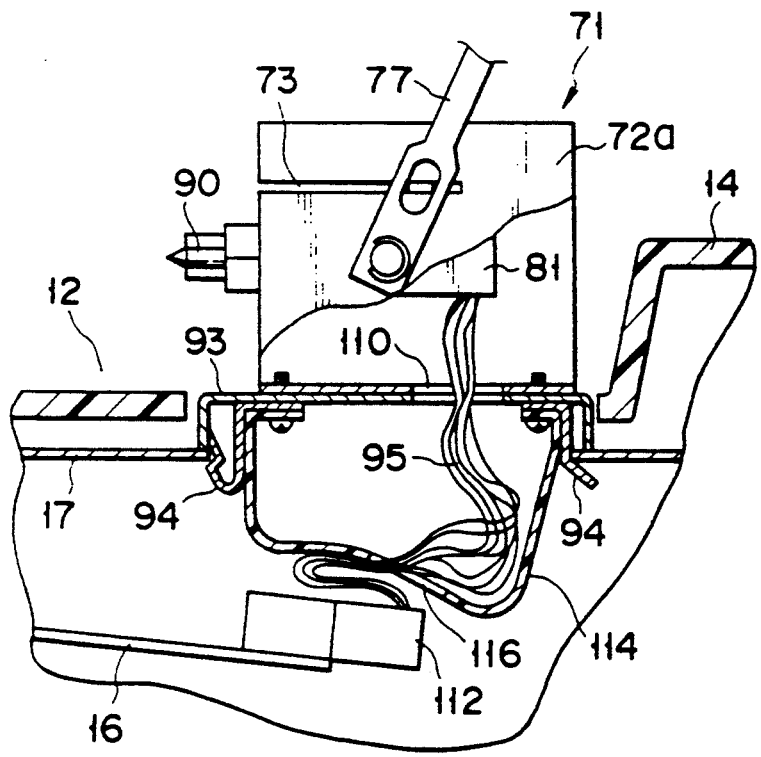
F I G. 20
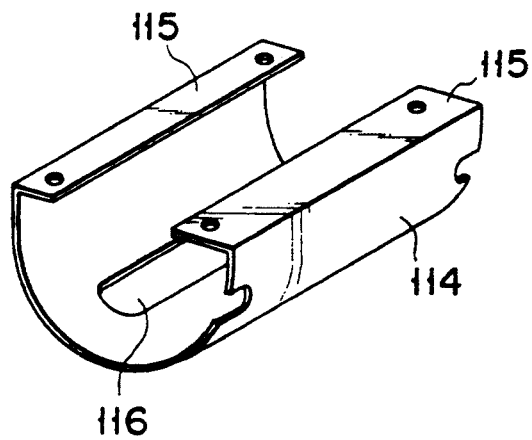
F I G. 21

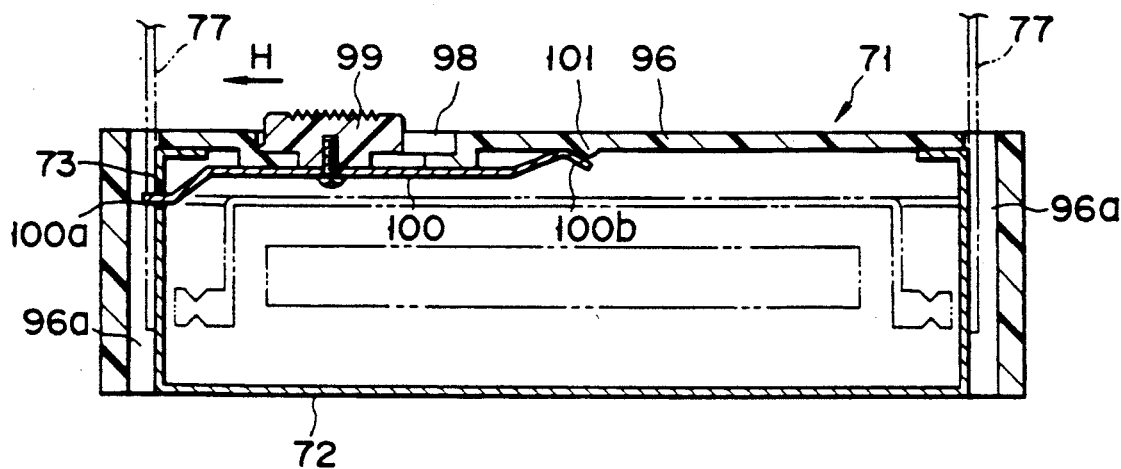
F I G. 22
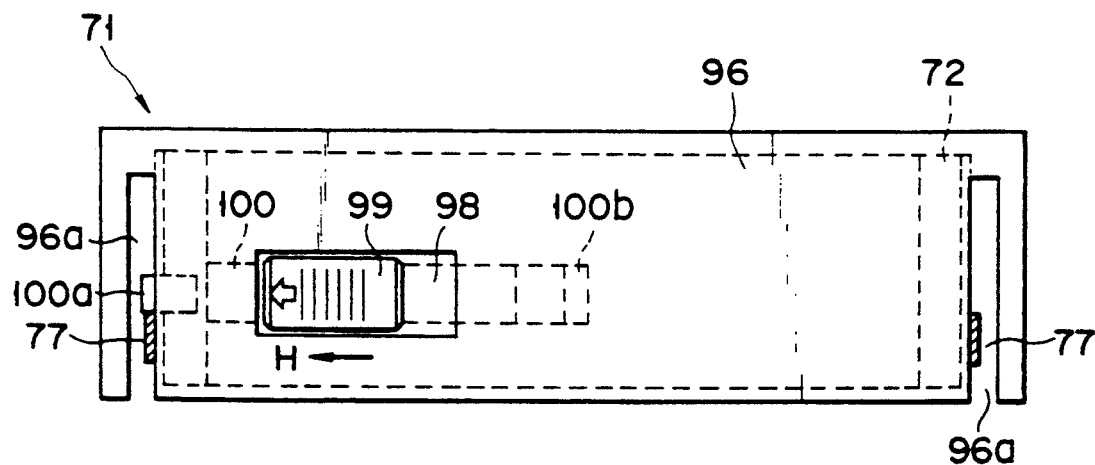
F I G. 23

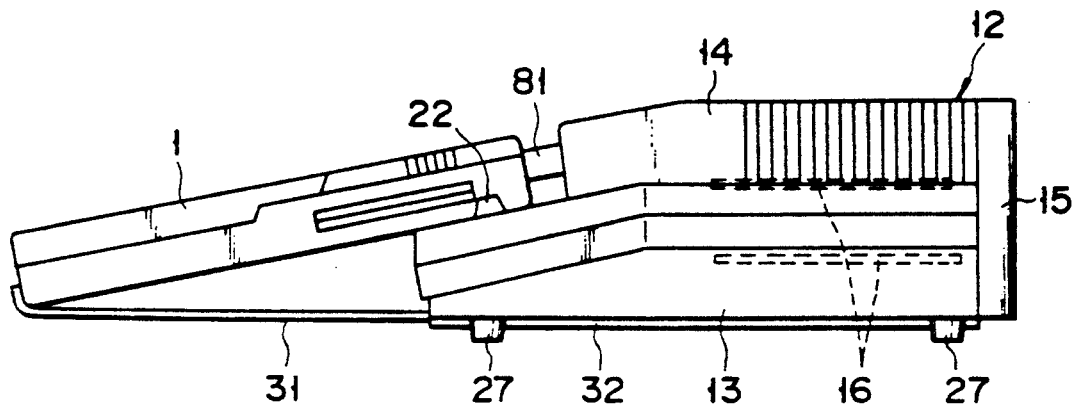
F I G. 27
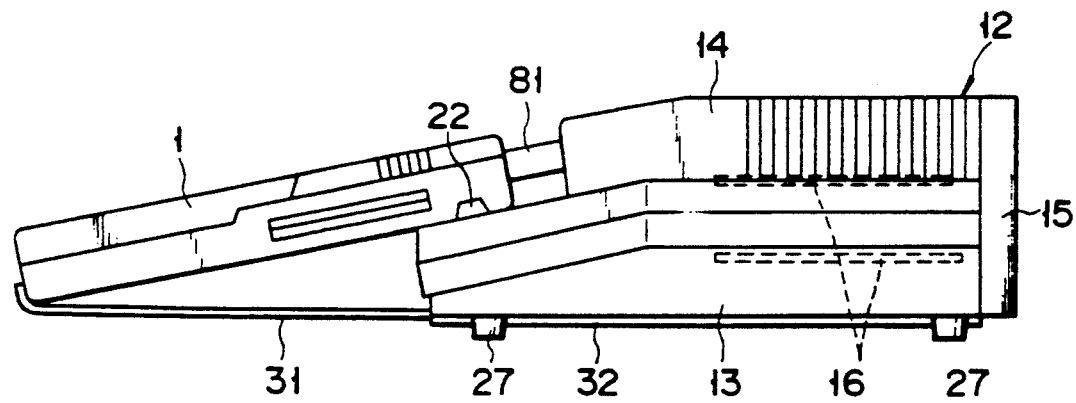
F I G. 28

CONNECTOR UNIT WITH MOVABLE CONNECTOR

This application is a continuation of application Ser. No. 07/777,593, filed on Oct. 16, 1991, now abandoned, which was a Div. of application Ser. No. 07/627,738, filed on Dec. 14, 1990, now U.S. Pat. No. 5,182,698.

BACKGROUND OF THE INVENTION

1. Field of the Invention

The present invention relates to a function expanding apparatus adapted to be connected with a portable compact electronic device, such as a laptop personal computer or word processor, thereby expanding the function of the electronic device, and also relates to a connector unit suitable for the apparatus.

2. Description of the Related Art

A compact electronic device has predetermined functions. If it requires further functions, it is used with a function expanding apparatus which is designed to ensure those additional functions. This expanding apparatus adapted to be fitted with the electronic device so that signals can be transferred between the two.

One such expanding apparatus is disclosed in U.S. Pat. No. 4,769,764. This apparatus comprises a housing which has a fitting recess as large as a compact electronic device. The whole electronic device is mounted in the recess so as to be removable from the front side of the recess. In this arrangement, the respective connectors of the expanding apparatus and the electronic device are connected to each other by plug-in connection. Thus, the compact electronic device is mounted on the expanding apparatus when it is used.

Since the fitting recess has the same size as the compact electronic device, however, the aforesaid conventional expanding apparatus is unsuited for use with other compact electronic devices which are different in depth, so that the range of its application is narrow.

Conventionally, the expanding apparatus and the electronic device are connected by means of a signal cable which is fitted with a plug-in connector on each end thereof. More specifically, they are connected by manually inserting a connector of the cable into that of the expanding apparatus or the electronic device.

In another known arrangement for connection, an expanding apparatus is fixedly fitted with a plug-in connector and an insertion guide continuous therewith, and a connector attached to the rear portion of a compact electronic device is connected directly to the connector of the expanding apparatus by means of the insertion guide.

In making connection according to the former arrangement, however, the connector of the signal cable must be grasped in hand, so that the connection work is troublesome. If the connectors have a large number of terminals, moreover, a great force is required to disconnect them manually from each other. Further, the connection or disconnection work requires a wide working space. When mounting the compact electronic device, which has the connector on its rear face, on the front portion of the expanding apparatus, therefore, it is difficult to secure the working space. Thus, this arrangement is not practical.

On the other hand, the latter arrangement for connection is used on the assumption that the position of the connector on the side of the electronic device relative to the connector of the expanding apparatus is fixed. Therefore, if this premise is not valid, that is, if the location of the connector of a electronic device is least deviated from that of the connector of the compact electronic device adapted for this arrangement, the connectors cannot be connected. Thus, the range of application of the expanding apparatus is limited.

SUMMARY OF THE INVENTION

The present invention has been contrived in consideration of these circumstances, and its object is to provide a function expanding apparatus and a connector unit for compact electronic devices, which permit various types of compact electronic devices with different sizes to be mounted for use.

In order to achieve the above object, a function expanding apparatus according to the present invention comprises a casing containing therein a circuit board for function expansion, the casing having a bearing portion for bearing the rear portion of an electronic device in a manner such that the front portion of the electronic device, including a front edge portion, extends in a predetermined direction from the casing; an apparatus-side connector provided on the casing, connected electrically to the circuit board, and removably connected to the connector of the electronic device set on the bearing portion; and means for holding the electronic device on the bearing portion in a manner such that the connector of the electronic device is connected to the apparatus-side connector, the holding means including a retaining portion for engaging the front edge portion of the electronic device on the bearing portion, and a connecting portion connecting the retaining portion to the casing so that the retaining portion is movable in the predetermined direction.

According to the present invention, the casing is fitted with a connector unit in a position to face the connector exposed to the rear face of the electronic device, which is positioned on the casing, in order to make the attachment and detachment of the compact electronic device easy and to reduce an impact given by the attachment or detachment work. The unit includes a connector holder, which is fitted with a slider capable of reciprocating in the direction to approach and leave the connector on the side of the electronic device. Further, the holder is provided with an operating portion for moving the slider, and the slider is fitted with the apparatus-side connector which is adapted to be removably inserted into the device-side connector for connection.

In order to prevent the connectors from being damaged when the compact electronic device mounted on the expanding apparatus is carelessly lifted, moreover, the holder of the connector unit has fitting pieces on its lower surface which are adapted to removably engage the edge of a fitting portion in the casing, the fitting pieces being preferably formed of an elastic material.

In mounting the compact electronic device on the expanding apparatus of the invention, the holding means is first drawn out forward for a suitable distance from the casing, and the electronic device is then mounted from above the casing. In doing this, the rear portion of the electronic device is placed on the bearing portion of the casing, and its front edge is engaged with the holding means. Thereupon, the electronic device has its rear portion supported on the bearing portion, and is restrained from moving forward, i.e., in the direction to cause the connectors to be disengaged, by the holding means. Thus, the electronic device can be mounted and held in position on the casing.

Since the holding means is movable in the depth direction with respect to the casing, its position can be aligned with the front edge portion of each of various types of compact electronic devices with different depths, whose rear portion is placed on the bearing portion, by adjusting the distance of the movement of the holding means. Thus, various types of compact electronic devices can be mounted on the expanding apparatus.

The connector of the compact electronic device thus mounted on the casing is connected with the apparatus-side connector by plug-in connection. By doing this, signals are allowed to be transferred between the expanding apparatus and the electronic device.

As the compact electronic device is mounted and positioned with respect to the casing, moreover, the connector of the electronic device and the connector of the expanding apparatus are opposed to each other. These two connectors are plug-in-connected to each other by moving the slider, with the apparatus-side connector thereon, toward the electronic device by means of the operating portion of the connector unit, using the connector holder as a guide. The connected connectors can be disengaged from each other by moving the operating portion in the direction opposite to the moving direction for the connection. As the slider is moved away from the electronic device by doing this, the apparatusside connector is drawn out from the device-side connector. In the attachment or detachment of the connectors described above, the electronic device need not be moved, so that high operating efficiency can be enjoyed, and the impact produced by the attachment or detachment work can be reduced.

Since the compact electronic device mounted on the expanding apparatus can be moved upward for the removal from the apparatus, it may possibly be lifted without disconnecting the two connectors from each other.

In such a case, a disengaging force acts on the fitting pieces of the connector holder during the removal of the electronic device. If this force exceeds a predetermined level, the fitting pieces undergo elastic deformation to be disengaged from the edge of the fitting portion of the casing. In this manner, the connected connectors can be prevented from being subjected to an overload.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 to 23 show a function expanding apparatus according to an embodiment of the invention, in which:

FIG. 2 is a perspective view showing the expanding apparatus with its supporting plate drawn out and a compact electronic device disengaged therefrom, FIG. 3 is a perspective view of the expanding apparatus fitted with the compact electronic device, FIG. 4 is a side view of the expanding apparatus, FIG. 5 is a perspective view of a casing cleared of its cover, FIG. 6 is an enlarged perspective view of a positioning member, FIG. 7 is a bottom-side perspective view of the expanding apparatus with its supporting plate drawn out, FIG. 8 is a partial plan view showing a stopper mechanism incorporated in a base of the casing, FIG. 9 is a sectional view of the stopper mechanism taken along line XI—XI of FIG. 8, FIG. 10 is a sectional view of the stopper mechanism taken along line X—X of FIG. 8, FIG. 11 is a sectional view of the stopper mechanism taken along line XI—XI of FIG. 8, FIG. 12 is a perspective view showing a connector unit with its cover omitted, FIG. 13 is a front view showing the connector unit with its cover omitted, FIG. 14 is a rear view showing the connector unit with its cover omitted, FIG. 15 is a side view showing the connector unit with its cover omitted and with a handle on the rear side, FIG. 16 is a side view showing the connector unit with its cover omitted and with the handle on the front side, FIG. 17 is a sectional view of the unit taken along line XVII—XVII of FIG. 13, FIG. 18 is a sectional view of a connector taken along line XVIII—XXVIII of FIG. 13, FIG. 19 sectional view showing an arrangement for mounting the connector unit, FIG. 20 is a sectional view showing the connector unit attached to the casing, FIG. 21 is a perspective view of a cable protection cover, FIG. 22 is a sectional view of a handle stopper mechanism of the connector unit, and FIG. 23 is a plan view of the handle stopper mechanism; and FIGS. 24 to 28 show a function expanding apparatus according to a second embodiment of the present invention, in which:

FIG. 24 is a perspective view showing the apparatus and a compact electronic device adapted to be mounted thereon, FIG. 25 is a sectional view showing a connector unit of the apparatus, FIG. 26 is a partially cut-away plan view of the connector unit, FIG. 27 is a side view showing the compact electronic device mounted in the apparatus, and FIG. 28 is a side view showing another compact electronic device with a shorter depth mounted on the apparatus.

DETAILED DESCRIPTION OF THE PREFERRED EMBODIMENTS

Embodiments of the present invention will now be described with reference to the accompanying drawings.

Figure 1:
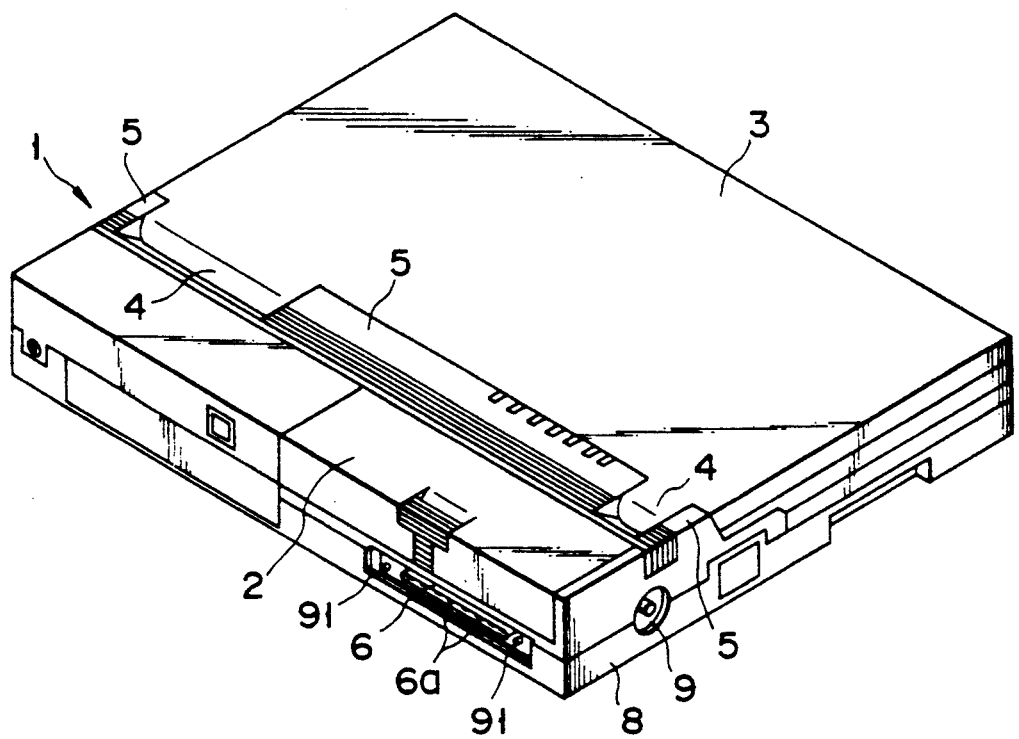
FIG. 1 is a perspective view showing an example of a compact electronic device adapted to be mounted on a function expanding apparatus according to the present invention.
Figure 2:
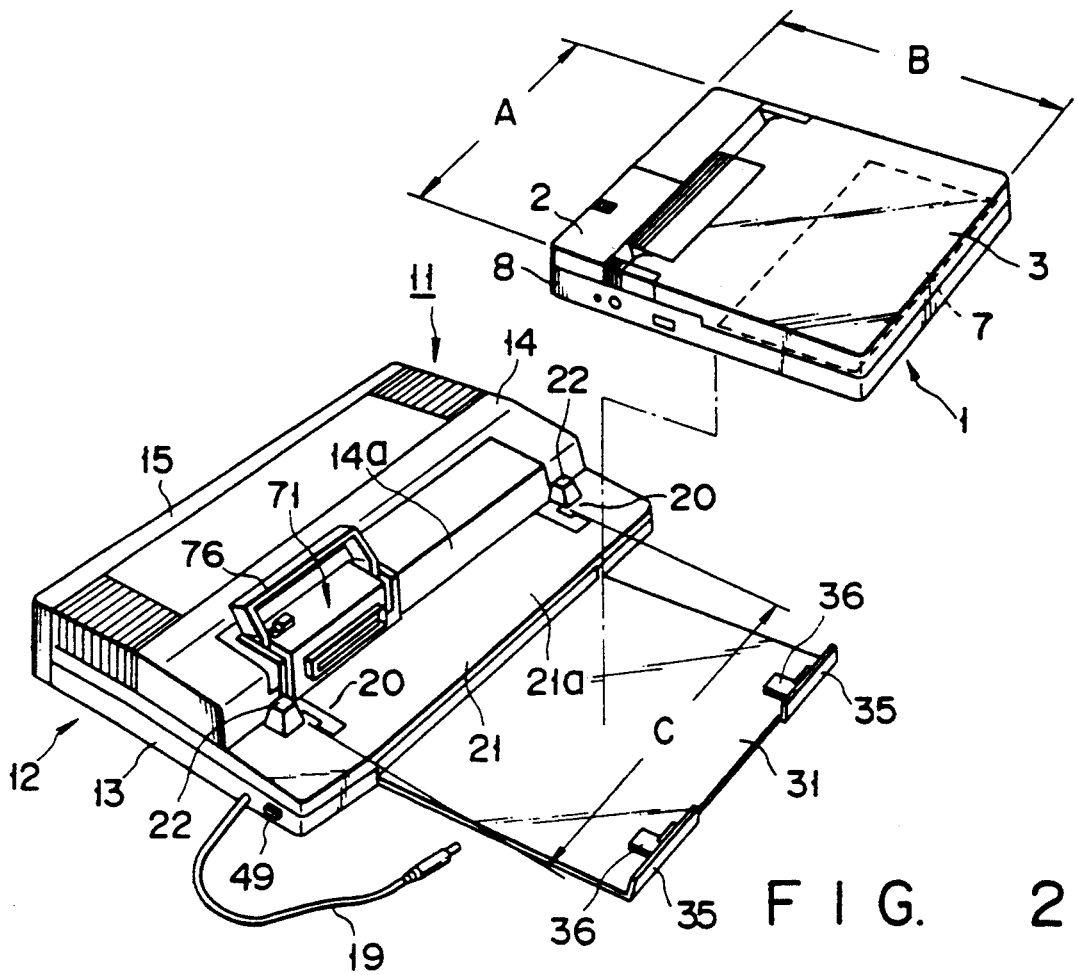

FIG. 2 shows a function expanding apparatus according to a first embodiment of the invention and a personal computer 1 for use as a compact electronic device to which the expanding apparatus is applied. The computer 1 has a rectangular plane shape and is of the size A4. Generally, it is called a notebook- or book-type personal computer. As shown in FIGS. 1 and 2, the computer 1 comprises a battery pack 2, which is removably attached to the rear portion of a housing 8, and a flat-panel display unit 3 situated in front of the pack 2. The display unit 3 has a pair of pivotal projections 4 rockably connected to pivot portions 5 of the housing 8, whereby the unit 3 can swing up and down around the portions 5.

The computer 1 further comprises a keyboard 7, which is located in front of the housing 8, and is adapted to be concealed when the display unit 3 is closed. A connector 6 is provided on the rear portion, e.g., rear face, of the housing 8. This connector is of a plug-in type having a large number of terminals 6a arranged side by side. Normally, the connector 6 is concealed under a cover (not shown) which is removably attached to the rear face of the housing 8. If necessary, the connector 6 can be exposed to the back of the housing by removing this cover.

As shown in FIG. 2, the computer 1 has a width-direction size A and a depth-direction size B. The function expanding apparatus 11 may be connected with various types of compact electronic devices whose width-direction sizes A are equal and whose depth-direction sizes B are different. In this case, the respective connectors 6 of these electronic devices have the same construction, and are mounted in the same position.

The following is a description of the function expanding apparatus 11 to which the personal computer 1 is removably attached as required.

Figure 4:
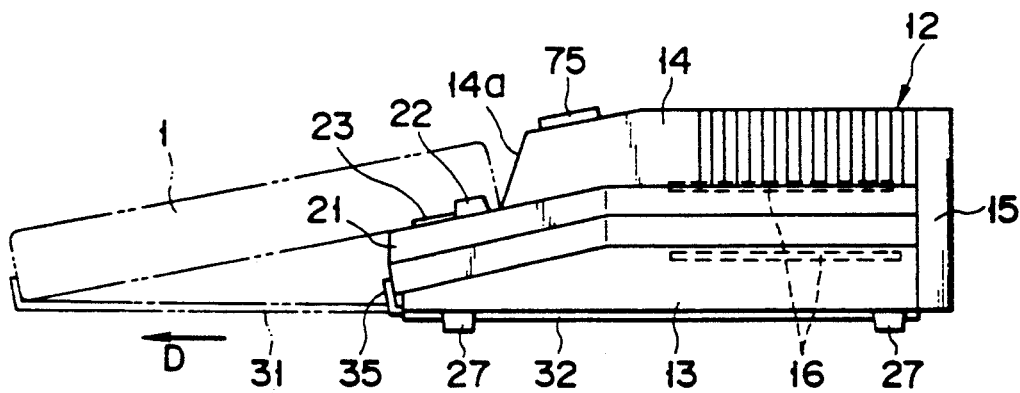
Figure 3:
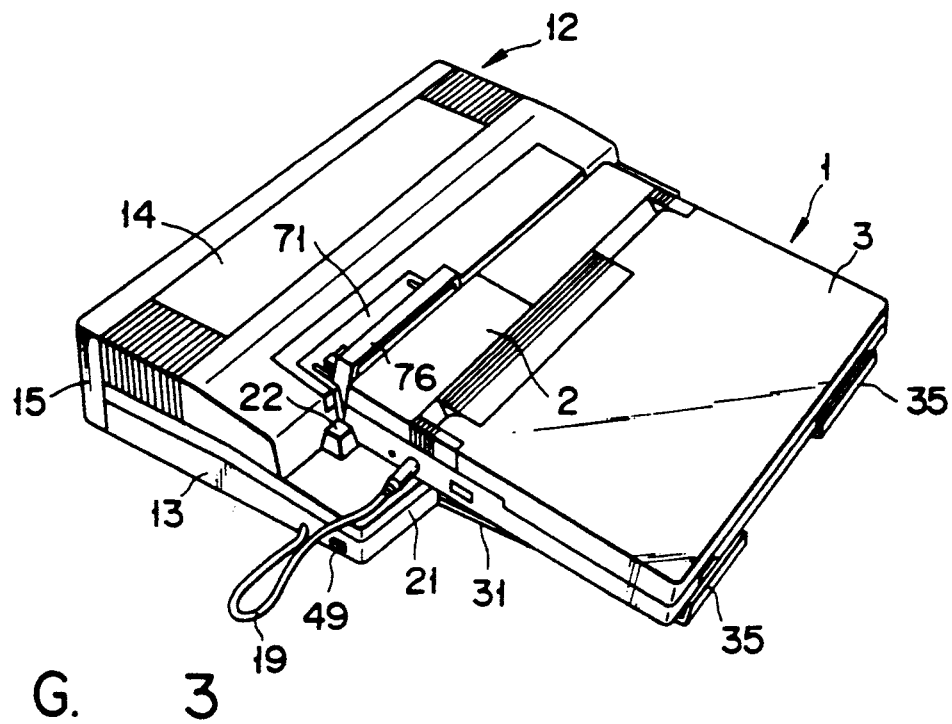

As shown in FIGS. 2 to 4, the expanding apparatus 11 comprises a plastic casing 12, which is formed of a substantially rectangular base 13, a cover 14, and a rear plate 15. The cover 14 overlies the base 13, and the rear plate 15 is mounted so as to close a rear opening (not shown) defined by the base 13 and the cover 14.

A plurality of modular circuit boards 16 for function expansion are arranged horizontally in the casing 12. The circuit boards 16 include one for personal computer communication, one for memory, one mounted with a hard disc drive, etc. Besides the circuit boards, an AC adapter (not shown), exhaust fan, and the like are housed in the casing 12.

Figure 5:
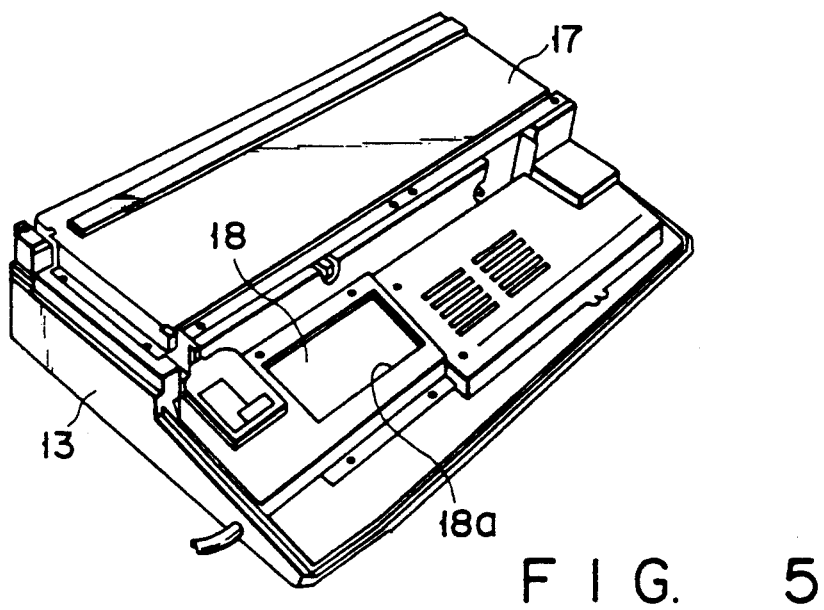

As shown in FIG. 5, the electrical parts, including the circuit boards 16, AC adapter, etc., are concealed under a shield cover 17. A rectangular fitting hole 18 is formed in the upper surface of the front portion of the cover 17. The hole 18 is used to mount a connector unit mentioned later. In FIGS. 2 and 3, numeral 19 denotes a power cord having a feeder plug at its extreme end which is adapted to be inserted into a power socket 9 (see FIG. 1) of the computer 1. The cord 19 is led out from one side face of the casing 12.

The front portion of the casing 12 serves as a supporting portion 21 which carries thereon the rear portion of the computer 1. Thus, the cover 14 is stepped so that its front side is lower in level than its rear side, with respect to a step portion 14a. The supporting portion 21 is defined by a top wall 21a on the front side and the step portion 14a. The top wall 21a declines to the front side.

A positioning member 20 having a projection 22 in the shape of a truncated pyramid is provided on each side of the upper surface of the top wall 21a. The distance C (see FIG. 2) between the respective roots of the paired projections 22 is substantially equal to the width A of the computer 1. The positioning members 20 are used to restrain the crosswise movement of the rear portion of the computer 1, thereby positioning the computer 1 crosswise with respect to the expanding apparatus. The step portion 14a abuts against the rear face of the computer 1 on the supporting portion 21, thereby restraining the rearward movement of the computer. Thus, the members 20 and the step portion 14a constitute positioning means for positioning the rear portion of the computer 1 with respect to the expanding apparatus.

Figure 6:
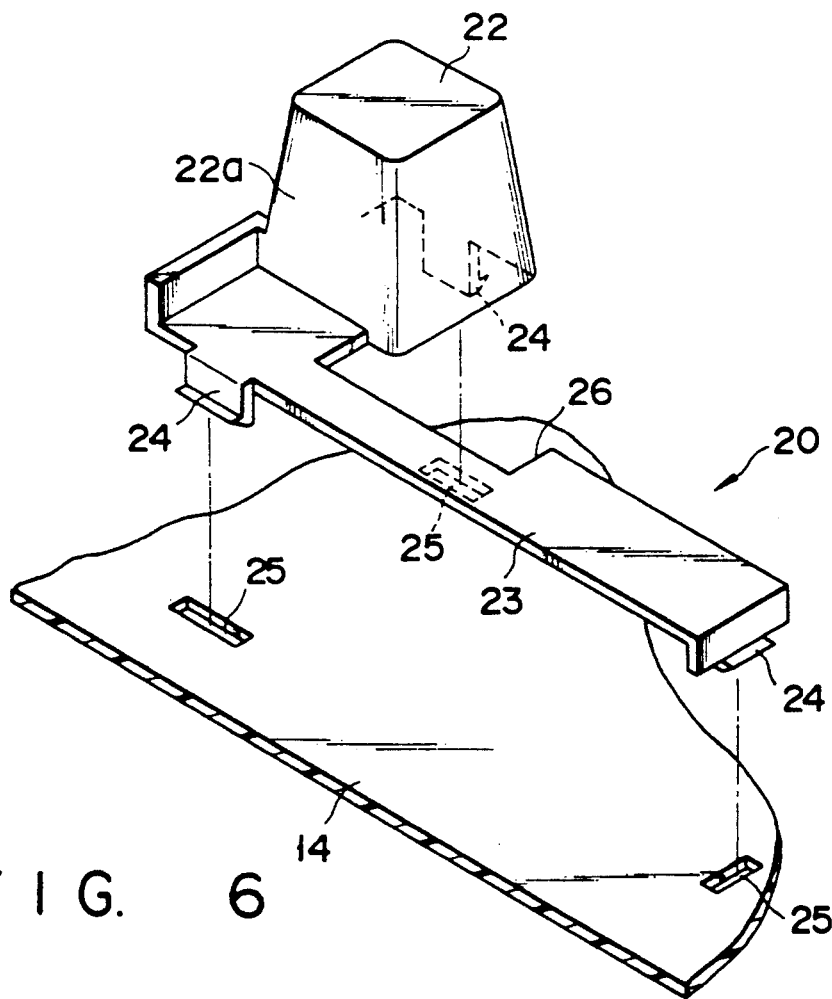

Although each positioning member 20 may be formed integrally with the cover 14, it is attached as an independent member to the cover 14 in the case of the present embodiment. In order to lessen damage or impact at the time of mounting, the member 20 is formed from a synthetic resin softer than the material of the cover 14. FIG. 6 shows the way the member 20 is mounted on the top wall 21a.

Each member 20 is provided integrally with a receiving plate 23 which, adjoining the base of a positioning side face 22a of the projection 22, is adapted to carry the computer 1 thereon. Hooks 24 protrude integrally from the receiving plate 23 and the lower end of the projection 22. These hooks 24 are inserted individually into slits 25 in the top wall 21a of the cover 14 so as to be caught by the edges of the slits. Thus, each positioning member 20 is mounted on the upper surface of the top wall 21a which constitutes the supporting portion 21. In FIG. 6, numeral 26 denotes a recess in which a projection (not shown) on the lower surface of the rear portion of the computer 1 is allowed to be fitted. The function expanding apparatus can be made applicable to compact electronic devices with different width-direction sizes A by mounting the positioning members 20 on the top wall 21a so that the distance C between the projections 22 can be adjusted.

As shown in FIGS. 2 to 4, 7 and 8, the bottom of the casing 12 is formed flat, and four legs 27 are attached individually to the four corners of the bottom. Also, the bottom of the casing 12 is fitted with a rectangular plastic supporting plate 31, which can be drawn out forward from the casing in the direction of arrow D. A pair of parallel guide plates 32 are screwed to the outer surface of the bottom wall of the casing 12. These plates 32, which are formed of synthetic resin, extend in the depth direction of the casing 12 or in the direction of arrow D. The supporting plate 31 is attached to the casing 12 for movement in the direction of arrow D so that its right and left side edge portions are fitted individually in groove portions formed between the outer surface of the bottom wall and the guide plates 32.

A retaining projection 33 is located on each side of the rear end portion of the supporting plate 31, and a step portion 34 is formed at the front end portion of each groove portion so that it can engage its corresponding projection 33. As the projections 33 engage their corresponding step portions 34, the plate 31 can be prevented from being excessively drawn out forward from the casing 12.

A pair of retaining portions 35 are formed on either side of the front edge of the supporting plate 31. Each portion 35 is formed by upwardly bending a flange integral with the plate 31. As mentioned later, these retaining portions 35 engage the front edge portion of the computer 1 on the supporting portion 21, thereby restraining the forward movement of the computer relative to the casing 12. A rubber plate 36 is pasted on each retaining portion 35 and a front part of the supporting plate 31 continuous therewith.

A stopper mechanism 41 for restraining the movement of the supporting plate 31 is disposed in the casing 12. The following is a description of this mechanism 41.

As shown in FIGS. 8 to 11, the stopper mechanism 41 includes a metallic guide plate 42 which is located on the base 13 of the casing 12 so as to extend in the width direction thereof. The guide plate 42 is formed having a horizontal portion 42a, which is screwed to the inside of the front portion of the base 13, and a vertical portion 42b rising upward from the front end of the portion 42a. Placed on the upper surface of the horizontal portion 42a is an elongated metallic slider 43 which can slide in the longitudinal direction of the guide plate 42. The slider 43 has a U-shaped cross section. A slot 44 extending in the depth direction of the casing 12 is formed at the left-hand end portion (FIG. 8) of the slider 43, and a coil spring 45 is stretched between the right-hand end of the slider and the guide plate 42. The spring 45 urges the slider 43 in the direction of arrow E of FIG. 8. A rocking lever 47 is mounted on the slot-side end portion of the guide plate 42 by means of a pivot 46. A shaft portion 48, which is attached to one end portion of the lever 47, is fitted in the slot 44, and a movable shaft 49a of a release button 49 abuts against the other end portion of the lever 47. The button 49, which is provided at one side wall of the base 13, can be pressed from the outside of the casing 12.

Figure 8:
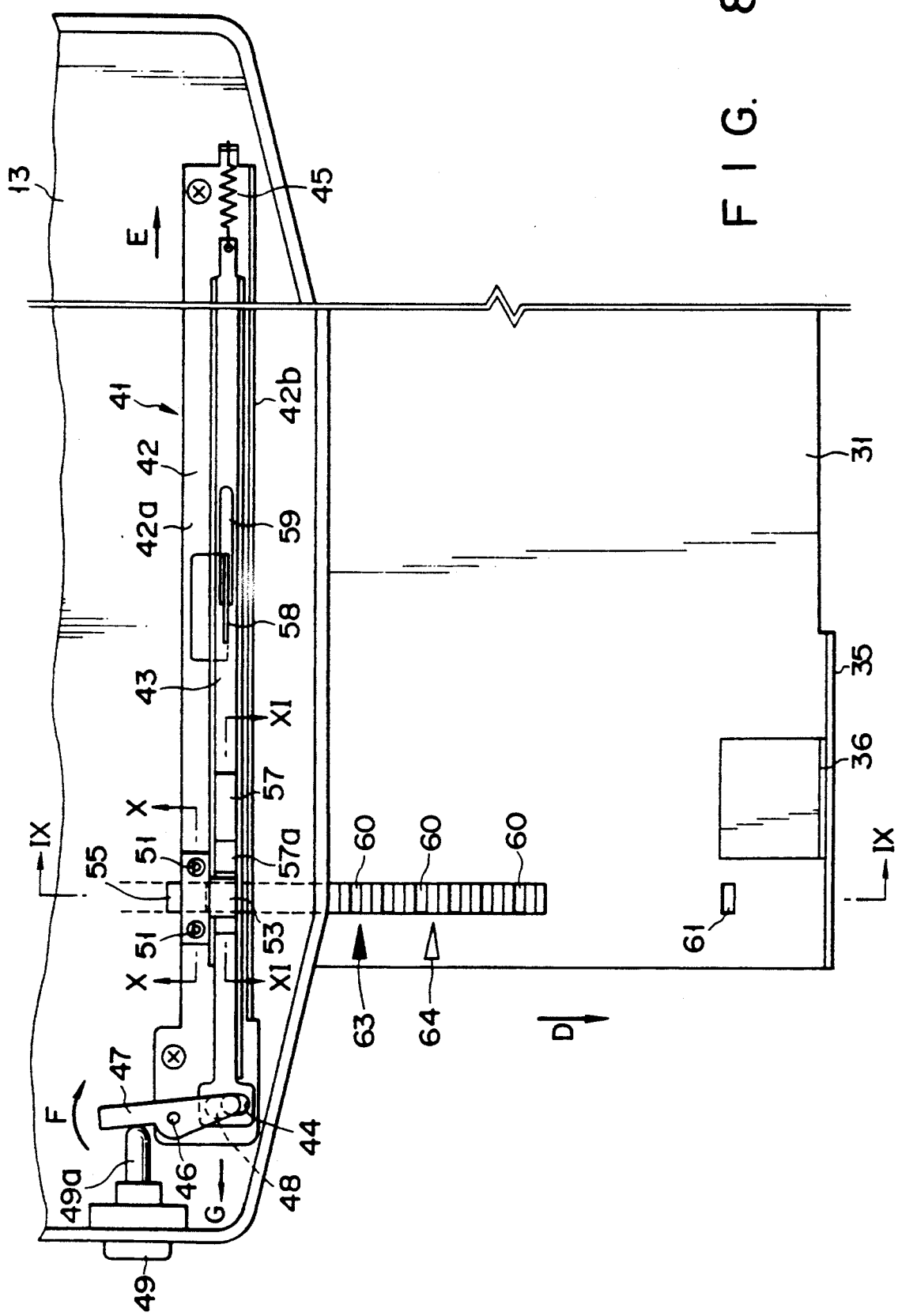

Thus, when the release button 49 is depressed, the movable shaft 49a causes the rocking lever 47 to rock in the direction of arrow F of FIG. 8. Thereupon, the metallic slider 43 is moved in the direction of arrow G of FIG. 8 on the guide plate 42, against the urging force of the coil spring 45. When the depression of the button 49 is discontinued, the slider 43 is restored to its original state (shown in FIG. 8) by means of the urging force of the spring 45.

Plastic stoppers 50 (only one of which is shown) are attached individually to the two opposite end portions of the guide plate 43. A pair of parallel guide shafts 51 are set up on a stopper mounting portion of the guide plate 43, and the stopper 50 is fitted on the shafts 51 for up-and-down motion. The stopper 50 is provided integrally with a stopper projection 52, which projects downward through a hole 13a in the bottom wall of the base 13, and a cam follower 53 opposed to the upper surface of the slider 43.

A spring bearing plate 54 is mounted on and between the respective upper end portions of the paired guide shafts 51. A leaf spring 55 is interposed between the bearing plate 54 and the upper surface of the stopper 50, and is welded to the plate 54. In FIGS. 9 and 10, numeral 56 denotes a retaining ring which is fixed to each guide shaft 51 to position the spring bearing plate 54. The spring 55 continually urges the stopper 50 downward.

Figure 11:
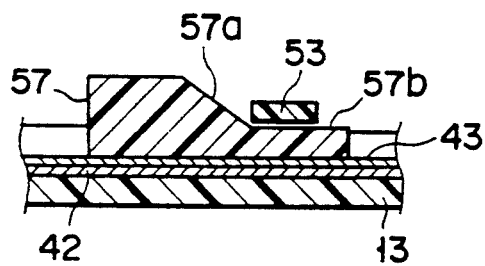

A pair of cams 57 (only one of which is shown) are mounted on the metallic slider 43, corresponding to the stoppers 50. The cam 57, which is made of synthetic resin, has a slanting cam surface 57a, as shown in FIG. 11. As the slider 43 reciprocates, the cam surface 57a approaches and leaves the cam follower 53 of the stopper 50, thereby moving the stopper up and down. When the surface 57a is disengaged from the follower 53, the stopper 50 is lowered by means of the urging force of the leaf spring 55.

Part of the guide plate 42 is raised upright to form a retaining piece 58. The piece 58 has a slit (not shown) which extends in the sliding direction of the metallic slider 43, and is fitted in a slot 59 of the slider 43. As the retaining piece 58 and the slot 59 engage each other, the slider 43 is located in a locked position shown in FIG. 8, and is also restrained from moving back and forth or upward. In the locked position, each cam 57 has its flat surface 57b opposed to the cam follower 53.

As shown in FIG. 9, the lower part of the front face the stopper projection 52 of each stopper 50 is in the form of a slanting surface 52a. As shown in FIGS. 8 and 9, moreover, a large number of engaging grooves 60, which are releasably engaged with the lower end portion of the projection 52, and one retaining groove 61 are formed on each side portion of the supporting plate 31 with respect to the width direction thereof. The engaging grooves 60 are arranged at predetermined pitches P in the sliding direction D of the plate 31, and the profile of each groove 60 is identical with that of the lower part of the stopper projection 52. As shown in FIG. 9, therefore, a slanting surface 60a is formed on the front side of each engaging groove 60. The retaining groove 61, which is designed in the same manner as each engaging groove 60, is located in front of the row of engaging grooves 60 at some distance from the front end thereof.

When the supporting plate 31 is pushed in toward the casing 12 from the drawn-out state shown in FIGS. 8 and 9, the stopper 50 is pushed up against the urging force of the leaf spring 55 by the action of the slanting surfaces 52a and 60a. Thus, the supporting plate 31 can be pushed in with ease. In contrast with this, the engagement between the stopper projections 52 and the engaging grooves 60 prevents the plate 31 from moving in the direction to be drawn out from the casing 12. Accordingly, the supporting plate 31 is prevented from being unexpectedly drawn out. The release button 49 is depressed as the plate 31 is drawn out. When the button 49 is depressed, the metallic slider 43 slides in the direction of arrow G. Thereupon, each stopper 50 is pushed up by the slanting surface 57a of the cam 57, so that the stopper projections 52 are disengaged from the engaging grooves 60. As a result, the supporting plate 31 is allowed to be drawn out.

As shown in FIG. 8, indexes 63 and 64 are provided near each row of engaging grooves 60 on the upper surface of the supporting plate 31. These indexes 63 and 64 are used as rough standards for the distance of draw-out of the plate 31 which depends on the depth B of each compact electronic device attached to the expanding apparatus 11.

Figure 7:
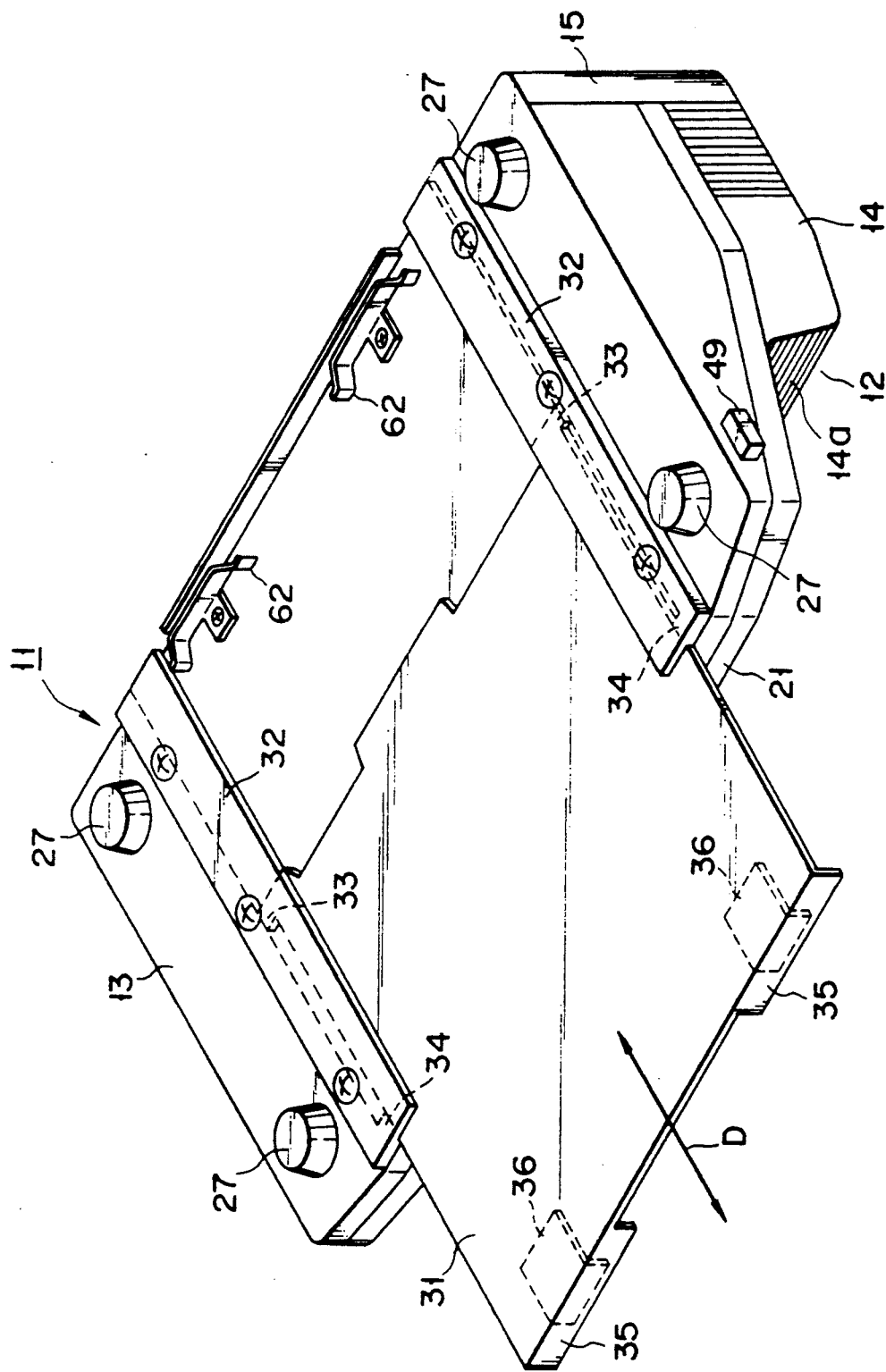

When the function expanding apparatus 11 is off duty, the supporting plate 31 is fully pushed in toward the casing 12, that is, into a retracted position where the plate 31 is concealed under the bottom of the casing 12, as shown in FIG. 4. When the supporting plate 31 is in the retracted position, the projection 52 of each stopper 50 engages its corresponding retaining groove 61, thereby locking the supporting plate. In this manner, the housed supporting plate 31 is prevented from being carelessly pushed out forward. As shown in FIG. 7, moreover, two leaf springs 62 are screwed to the rear end portion of the bottom surface of the base 13. When the supporting plate 31 is pushed into the retracted position, the springs 62 are pushed to be bent by the rear end edge of the plate 31, thereby producing an urging force to push out the plate 31 forward. If the release button 49 is depressed when the supporting plate 31 is drawn out, therefore, the springs 62 press the plate 31 forward, thereby reducing the force required for the draw-out of the plate 31.

The casing 12 is fitted with a connector unit 71 which is situated in a position to face the connector 6 of the computer 1 set on the supporting portion 21. Referring now to FIGS. 12 to 23, this unit 71 will be described.

As shown in FIGS. 12 to 17, the connector unit 71 is provided with a connector holder 72 made of sheet metal. The holder 72 has a horizontally extending rectangular bottom plate 72b and right- and left-hand side plates 72b set up individually on the opposite side edges of the bottom plate and facing each other. A horizontal guide slit 73 is formed in each side plate 72a so as to open at the front end thereof. A slider 74 made of sheet metal is mounted in the holder 72 so as to be able to reciprocate in the depth direction of the apparatus. The slider 74 is formed of a flat plate located parallel to the bottom plate 72b of the holder 72, and its opposite end portions are bent at right angles toward the plate 72b. Further, the slider 74 has overhanging pieces 75 which protrude horizontally from its opposite end portions. As these pieces 75 are inserted individually into the guide slits 73 of the holder 72, the slider 74 is supported in the holder so as to be movable, guided by the slits 73.

The respective lower ends of right- and left-hand arms 77 of a handle 76, for use as an operating portion, are rockably mounted on the side plates 72a of the connector holder 72 by means of pivots 78, individually. A slot 79 is bored through the middle portion of each arm 77 so as to extend in the longitudinal direction of the arm 77. A projecting piece 80, which protrudes integrally from the extreme end of each overhanging piece 75, is inserted in the slot 79. Thus, the slider 74 is reciprocated in the depth direction with respect to the holder 72 by rocking the handle 76 back and forth.

The distance Y from each pivot 78 as a fulcrum of the handle 76 to the extreme end (point of force) of the handle 76 is set longer than the distance X from the pivot 78 to the center (point of action) of each corresponding slot 79. Based on this relationship between the distances X and Y, the slider 74 can be subjected to a great moving force by rocking the handle 76 with a relatively small operating force.

The slider 74 supports a plug-in connector 81 having a large number of terminals 81a. This connector 81 on the side of the expanding apparatus can be fitted into the computer-side connector 6 for connection. In order to secure the plug-in connection with the connector 6, in the present embodiment, the connector 81 is floatingly mounted on the slider 74.

In order to mount the connector 81 in this manner, leaf springs 82 and 83 are attached to the lower surface of the slider 74 and the bottom plate 72b of the connector holder 72, respectively, so that the connector 81 is elastically held between the extreme ends of the springs 82 and 83 in the vertical direction. Besides, a tension spring 86 is stretched between a spring bearing portion 84, which is formed by bending the front portion of each end portion of the slider 74, and a spring bearing portion 85, which extends from the rear portion of its corresponding end portion of the connector 81.

Figure 12:
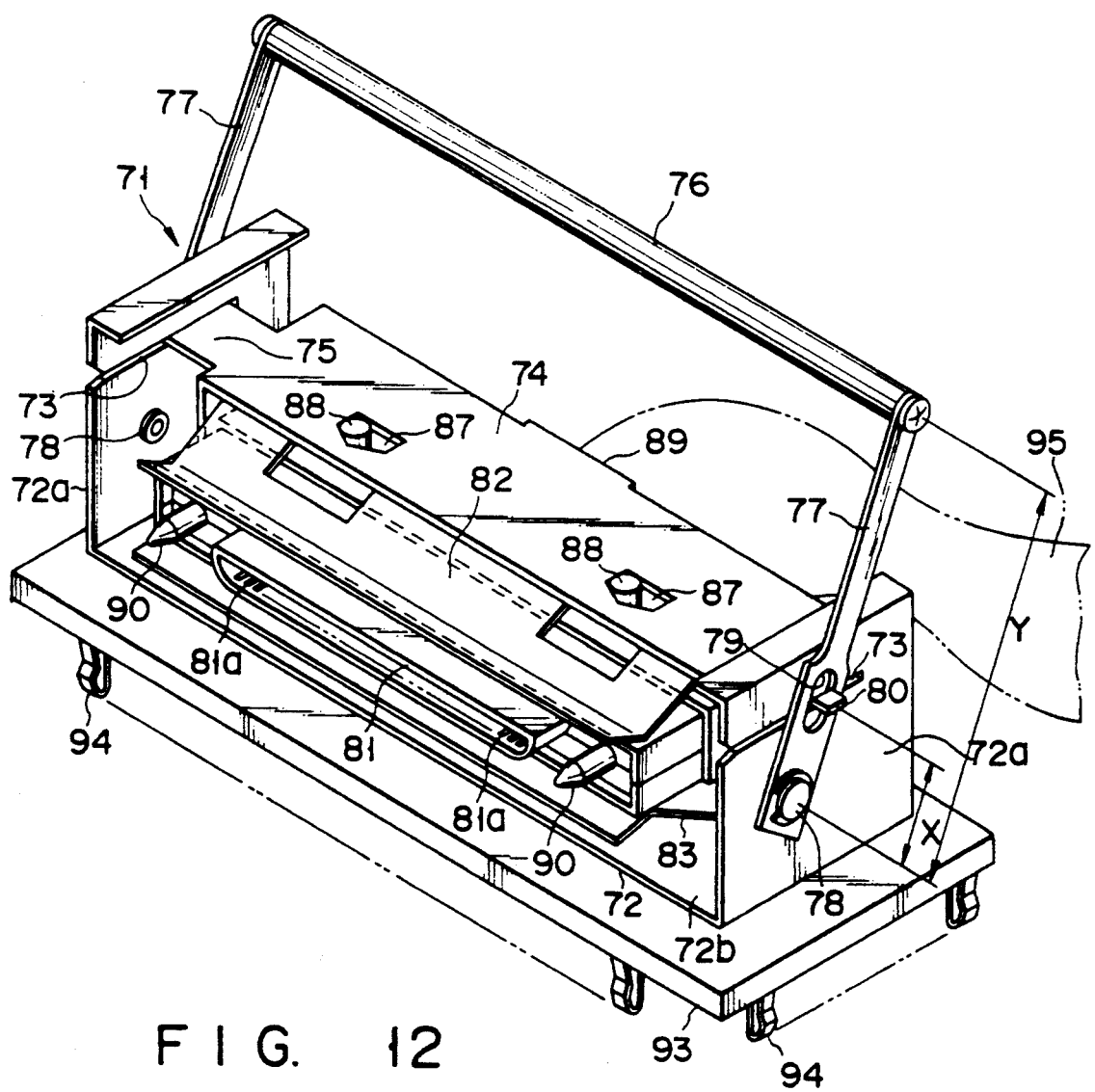
Figure 13:
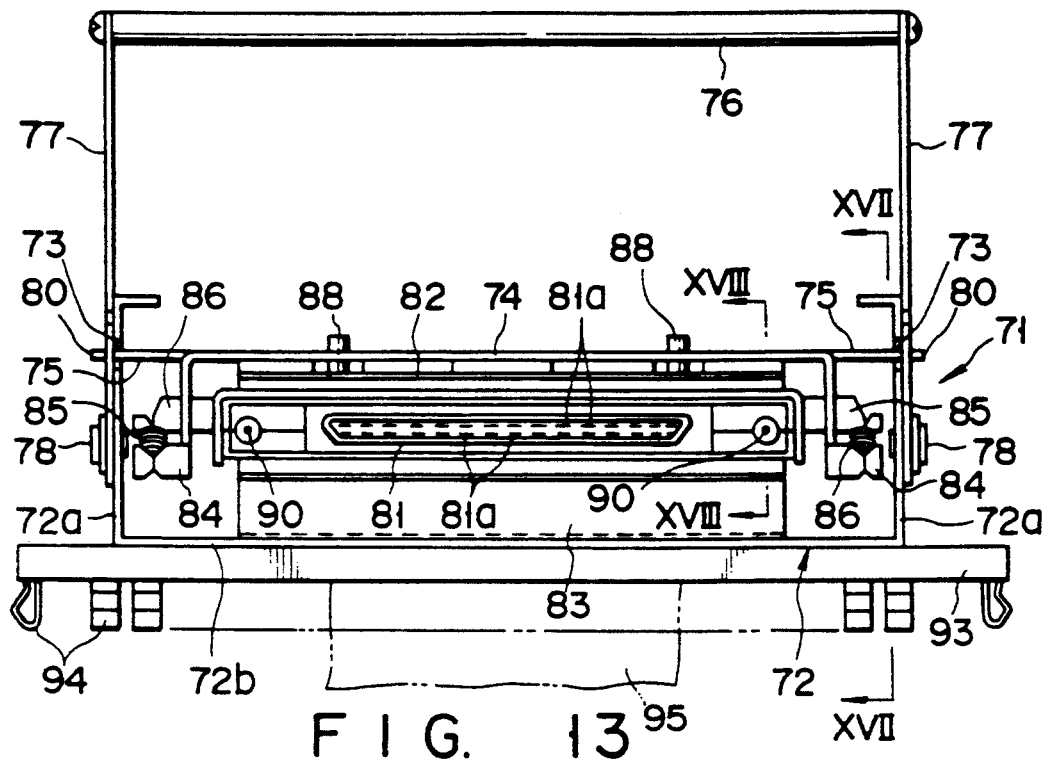
Figure 14:
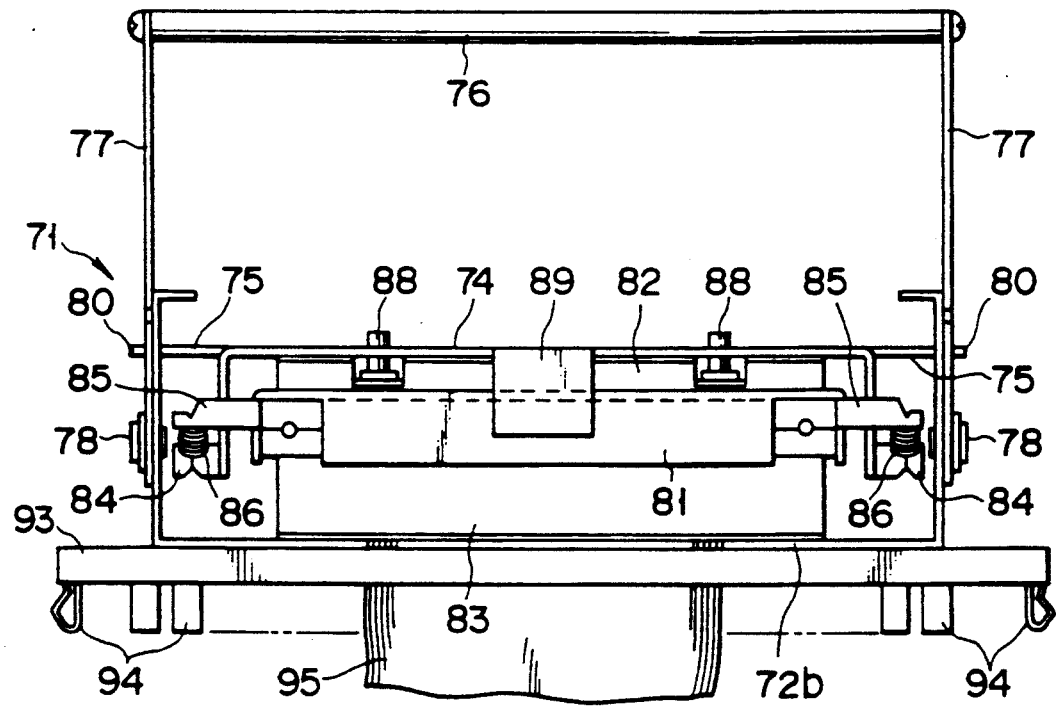

In order to position the floating connector 81 with respect to the slider 74, a pair of angular holes 87 are bored through the top wall of the slider 74, and a pair of pins 88 protruding from the upper surface of the connector 81 are passed through the holes 87, as shown in FIG. 12. The front edge of each angular hole 87 is V-shaped, and each corresponding pin 88 is engaged with the corner portion of the V. Each pin 88 is pressed against the V-shaped corner portion of the hole 87 by the urging force of the tension springs 86. Through the engagement between the respective front edges of the angular holes 87 and the pins 88, the rearward moving force of the slider 74 can be transmitted to the connector 81.

In order to push out the connector 81, thereby allowing it to be connected to the connector 6, a downward flange 89 is formed on the center of the rear portion of the slider 74. The flange 89, which faces the central portion of the rear face of the connector 81, transmits the forward moving force of the slider 74 to the connector 81. Thus, the connector 81 can be moved parallel without tilting when it is inserted into the connector 6. If the flange 89 is omitted, the rear edge of each angular hole 87 which is opposite to the Vshaped front edge can transmit the forward moving force of the slider 74 to the connector 81 by engaging its corresponding pin 88.

Figure 18:
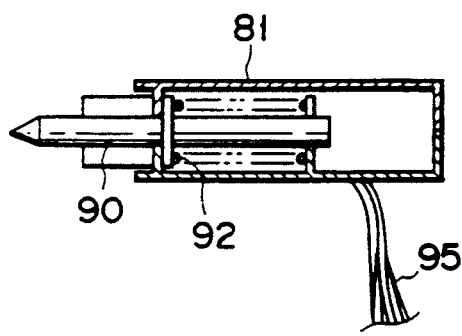
Figure 19:
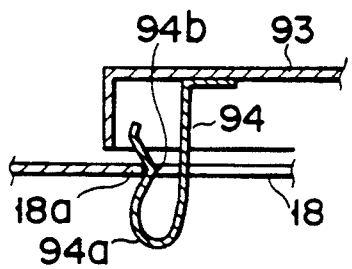

Guide pins 90 protrude forward from the opposite sides of the front portion of the connector 81, individually. Before the connectors 6 and 81 are connected to each other, the respective tip end portions of the pins 90, which are tapered, are inserted individually into holes 91 (see FIG. 1) in a metal fixture for the connector 6. The holes 91 open on an end face of the metal fixture. When the guide pins 90 are inserted individually into the holes 91, the floating connector 81 is moved and accurately positioned with respect to the connector 6. As shown in FIG. 18, each pin 90 is urged forward by means of a coil spring 92 which is contained in the connector 81. In connecting the connectors 6 and 81 to each other, the pins 90 are pushed in rearward lest they hinder the connection.

A base plate 93 made of sheet metal is fixed to the lower surface of the bottom plate 72b of the connector holder 72. A large number of fitting hooks 94 protrude from the lower surface of the plate 93. The hooks 94, which are each formed by bending a leaf spring, protrude individually from the underside of the front edge and the right- and left-hand edges of the base plate 93. As shown in detail in FIG. 19, each fitting hook 94 is formed of a tapered insert portion 94a and an engaging recess portion 94b continuous with each other.

The connector unit 71 is attached to the casing 12 of the expanding apparatus 11 by engaging the fitting hooks 94 with the fitting hole 18 (see FIG. 5) of the casing. In doing this, the hooks 94 are first aligned with the hole 18, and then pushed into the hole 18. Thereupon, the respective insert portions 94a of the fitting hooks 94 are inserted into the fitting hole 18 while undergoing elastic deformation. At the same time, the engaging recess portions 94b are elastically pressed against an edge 18a of the hole 18. Thus, the connector unit 71 is mounted on the casing 12. Naturally, in this mounted state, the base plate 93 and the shield cover 17 are connected electrically to each other by means of the fitting hooks 94, so that the connector unit can be electromagnetically shielded. Since the hooks 94 are elastically deformable, as described above, the connector unit 71 can be disengaged from the fitting hole 18 to be prevented from being damaged if it is subjected to an excessive drawing force by mistake.

As shown in FIG. 20, one end of a signal cable 95 is connected to the connector 81. The cable 95 is led from the connector 81 into the casing 12 through a through hole 110 in the bottom plate 72b of the holder 72 and the base plate 93 and the fitting hole 18 of the shield cover 17. The other end of the cable 95 is connected to the circuit boards 16 in the casing 12 by means of a connector 112. The cable 95 is so long that it cannot be partially drawn out from the hole 18 to have its other end portion subjected to a load as the connector unit 71 is removed.

A cable protection cover 114 is attached to the lower surface of the base plate 93. As shown in FIGS. 20 and 21, the cover 114 has a semicylindrical shape and is formed of an insulating elastic sheet, such as polyvinyl chloride. Both side edges of the cover 114 are bent inward to form flanges 115, individually. A passage hole 116 is bored through the cover 114. The cover 114 is attached to the base plate 93 in a manner such that its flanges 115 are screwed to the lower surface of the base plate, and is situated inside the fitting hooks 94. The signal cable 95 extends through the inside of the cover 114 and the passage hole 116 after passing through the through hole 110. Thus, each hook 94 and the cable 95 are isolated by means of the cover 114, so that the cable 95 can be prevented from being caught in between the hooks 94 and the edge 18a of the fitting hole 18 of the casing 12 when the connector unit 71 is fitted to the hole 18.

As shown in FIGS. 22 and 23, the principal part of the connector unit 71 is covered by means of a plastic cover 96, and the handle 76 is also concealed under a plastic handle cover (not shown). The cover 96 is formed having escape slits 96a which allow their corresponding arms 77 of the handle 76 to move. A guide groove 98 is formed in the top wall of the cover 96, and a locking knob 99 is fitted to the groove 98 so as to be slidable from side to side.

A stopper plate 100, which is located inside the cover 96, is screwed to the locking knob 99. The plate 100 is formed of a leaf spring, whose one end portion 100a can be inserted into one of the guide slits 73 of the holder 72. Thus, the one end portion 100a can hinder the rocking motion of the handle 76 by projecting into the path of travel of one of the arms 77 of the handle 76.

After the handle 76 is rocked in a direction such that the connector 81 projects from the holder 72 (see FIG. 16), the stopper plate 100 is moved in the direction of arrow H of FIGS. 22 and 23 by means of the locking knob 99. Thereupon, the one end portion 100a of the plate 100 is inserted into the one guide slit 73 to be situated behind the one arm 77 of the handle 76, so that the handle is prevented from rocking rearward. A projection 101 is formed integrally on the inner surface of the top wall of the cover 96. The other end portion of the stopper plate 100 forms a bent end portion 100b which is adapted to get over the projection 101. The moment the one end portion 100a is inserted into the one slit 73, the end portion 100b gets over the projection 101, thereby regulating the movement of the stopper plate 100.

The following is a description of steps of procedure for setting the computer 1 to the function expanding apparatus 11 constructed in this manner.

First, the supporting plate 31 is drawn out forward from the casing 12. This is done while the release button 49 is being depressed. More specifically, when the button 49 is depressed, the rocking lever 47 is rocked in the direction of arrow F of FIG. 8, and at the same time, the shaft portion 48 in the slot 44 moves the metallic slider 43 in the direction of arrow G of FIG. 8 by pulling it. Thereupon, the cam surface 57a of the cam 57 raises each stopper 50 through the medium of the cam follower 53, so that the projection 52 of the stopper 50 is disengaged from the retaining groove 61. As a result, the supporting plate 31 is pushed out forward by the urging force of the leaf springs 62. Thereafter, a user pulls out the plate 31 forward along the guide plates 32, etc.

The distance of draw-out of the supporting plate 31 is suitably selected depending on the depth B of the compact electronic device to be connected. This selection is made with reference to the index 63 or 64. After the plate 31 is drawn out in this manner, the release button 49 is released from the depression. As a result, the metallic slider 43 of the stopper mechanism 41 is returned to the locked position shown in FIG. 8 by the urging force of the coil spring 45. Accordingly, each stopper 50 is pressed down by the urging force of the leaf spring 55, so that the stopper projection 52 engages the engaging groove 60 right under the same, thereby preventing the plate 31 from being further drawn out. Thus, the supporting plate 31 can be held in a desired drawn-out position.

Then, the rear portion of the prepared computer 1 is set on the supporting portion 21 of the casing 12, and the front portion of the computer 1, which projects forward from the casing, is placed on the front portion of the supporting plate 31. In doing this, the opposite side faces of the rear portion of the computer 1 are engaged individually with the respective root portions of the side faces 22a of the projections 22 of the paired positioning members 20 which are provided at the supporting portion 21. Thus, the computer 1 is positioned in the width direction with respect to the casing 12. The rear face of the computer 1 is caused to abut against the step portion 14a of the supporting portion 21, and the portion 14a restrains the computer from moving rearward. If the retaining portions 35 of the supporting plate 31 are not in engagement with the front edge of the computer 1, in this state, the plate 31 is pushed in toward the casing 12 so that the portions 35 engage the front edge of the computer 1, and is locked to the retracted position by means of the stopper mechanism 41. Thus, the forward movement of the computer 1 is restrained by means of the pair of retaining portions 35. In consequence, the computer 1 is mounted in position on the casing 12, as shown in FIG. 3.

The top wall 21a of the supporting portion 21, which bears the rear portion of the computer 1 thereon, is situated higher in level than the supporting plate 31, and declines to the front side. Therefore, the computer 1, mounted on the casing 12 in the aforesaid manner, declines forward, as indicated by two-dot chain line in FIG. 4.

Since the distance of draw-out of the supporting plate 31 can be adjusted by stages according to the pitch P (see FIG. 9) of the engaging grooves 60, various other types of compact electronic devices 1, which have the same width A and different depths B, can be mounted on the expanding apparatus in the same steps of procedure as aforesaid. Thus, the expanding apparatus 11 is adapted for use with a wide variety of compact electronic devices 1, that is, for general-purpose application.

The connector 6 of the computer 1, mounted in position on the expanding apparatus 11 following the aforementioned procedure, is situated opposite to the apparatus-side connector or the connector 81 of the connector unit 71. In this state, the connector 81 is connected to the connector 6. This connection can be achieved by rocking the handle 76 of the unit 71 to the front side.

Figure 15:
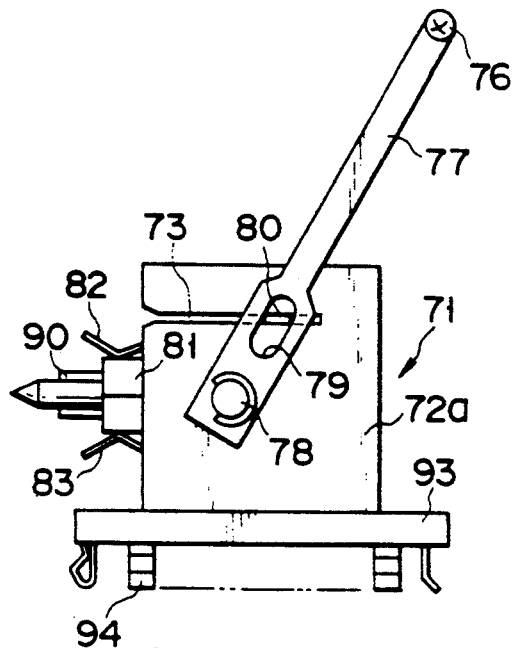
Figure 16:
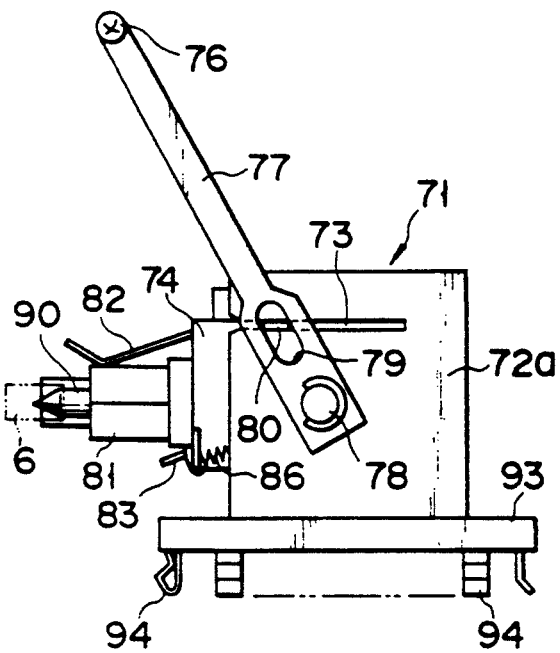
Figure 17:
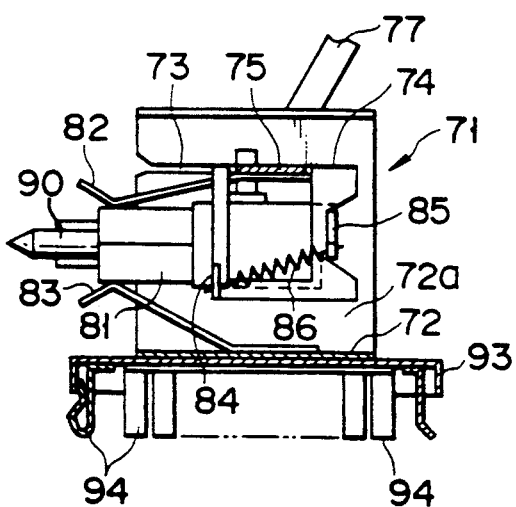

In the state before the connection, the handle 76 of the unit 71 is inclined rearward, as shown in FIGS. 2 and 15, and the connector 81 is situated in its retreated position where its extreme end portion is substantially flush with the step portion 14a of the casing 12. When the handle 76 is rocked forward, as shown in FIGS. 3 and 16, the slider 74 is pushed out forward along the guide slits 73 of the connector holder 72. As this is done, the connector 81 is also pushed out forward to reach its advanced position where it projects into the supporting portion 21.

Accompanying this movement, the respective tip end portions of the guide pins 90 are inserted into their corresponding holes 91 of the connector 6 immediately before the connector 81 touches the connector 6. Thereupon, the connector 81 can be accurately positioned with respect to the connector 6 through the guidance of the engagement between the pins 90 and the holes 91, even though the position of the connector 6 relative to the connector 81 is subject to some variation. The movement of the connector 81 based on this guidance is allowed by the elastic deformation of the leaf springs 82 and 83 and the coil spring 86 which support the connector 81 floatingly.

When the slider 74 is further advanced while the connectors 6 and 81 being positioned with respect to each other, the extreme end portion of the connector 81 is fitted into the connector 6. Thereupon, only the slider 74 slightly advances, due to resistance produced by the fitting operation, so that the respective rear edges of the angular holes 87 of the slider abut against the pins 88. At this point of time, therefore, the moving force of the slider 74 starts to be transmitted to the connector 81. Accordingly, the connector 81 is pushed out forward to be smoothly inserted into the connector 6 for connection. Thus, signals are allowed to be transferred between the computer 1 and the expanding apparatus 11. In this case, the guide pins 90 retreat against the urging force of the coil spring 92 to avoid hindering the connection between the connectors 6 and 81.

After the connectors 6 and 81 are connected in this manner, the locking knob 99 of the unit 71 is moved in the direction of arrow H of FIGS. 22 and 23, so that the one end portion 100a of the stopper plate 100 is inserted into the one guide slit 73. As a result, the handle 76 is prevented from rocking rearward, so that the connectors 6 and 81 can be prevented from being unexpectedly disconnected from each other.

The computer 1 can be removed from the expanding apparatus 1 by inversely following the aforementioned processes of mounting operation. In this case, a disengaging force starts to be transmitted to the connector 81 through the engagement between the pins 88 of the connector 6 and the respective V-shaped edges of the angular holes 87 at the point of time when the edges abut against their corresponding pins 88 as the handle 76 is rocked rearward to retreat the slider 74.

In the operation to connect or disconnect the two connectors 6 and 81, only the connector 81 on the side of the expanding apparatus 11 must be moved, and the whole computer 1 need not be moved. Since the connectors 6 and 81 have the numerous terminals 6a and 81a, respectively, their connection and disconnection both require a great force. In the arrangement of the present embodiment, however, the total weight of the computer 1 cannot bear on the connectors during the connection or disconnection, so that the connectors receive only a small impact from the attachment or detachment work. Thus, the connection and disconnection of the connectors do not exert any substantial bad influences on the computer 1 or the circuit components in the expanding apparatus 11, so that no trouble can be caused thereby.

As described above, the computer 1 can be removed upward from the expanding apparatus 11. Therefore, the computer 1 may possibly be lifted without disconnecting the connectors 6 and 81. In such a case, a great load acts on the fitting portion of the connector unit 71. However, the unit 71 is attached to the casing 12 by elastically engaging the fitting hooks 94 on the lower surface of the base plate 93 with the edge 18a of the fitting hole 18 of the casing. If the disengaging force acts on the unit 71 as the computer 1 is lifted in the aforesaid manner, therefore, the hooks 94 undergo substantial elastic deformation to be disengaged from the edge 18a of the hole 18 when the force attains a predetermined level. As a result, the connector unit 71 is detached from the casing 12. Thus, the connected connectors 6 and 81 cannot be subjected to an overload, and can be prevented from being damaged.

The connector unit 71 has the cable protection cover 114 which is attached to the lower surface of the base plate 93, and the signal cable 95 extending from the connector 81 is led into the casing 12 through the inside of the cover 114 and the passage hole 116 in the cover 114. In fitting the unit 71 to the fitting hole 18 of the casing 12, therefore, the cover 114 can prevent the cable 95 from being caught in between the fitting hooks 93 and the edge 18a of the hole 18. Thus, the cable 95 can be securely prevented from snapping.

Constructed in this manner, the function expanding apparatus 11 has the following advantages.

In the expanding apparatus 11, the casing 12 is provided with the supporting portion 21 on which the rear portion of the compact electronic device 1 is placed, and the paired positioning members 20 for positioning the electronic device with respect to the width direction are provided at the portion 21. Attached to the bottom portion of the casing 12, moreover, is the drawable supporting plate 31 whose draw-out distance can be varied depending on the depth of the electronic device 1. Further, the upward retaining portions 35 for retaining the front edge of the electronic device 1 are formed on the front portion of the plate 31. The position of each retaining portion 35 can be aligned with the front edge portion of each of various devices 1 with different depths, by adjusting the distance of draw-out of the supporting plate 31. Accordingly, the forward movement of the compact electronic device 1, which causes the connector 6 to be disengaged from the apparatus-side connector 81, can be restrained, so that the connectors can be prevented from being unexpectedly disconnected from each other. Thus, various types of compact electronic devices with different depths can be mounted on the expanding apparatus in a manner such that their movement in the width and depth directions is securely restrained. As a result, there may be provided a function expanding apparatus which can be fitted with various compact electronic devices, and enjoys a wide range of application. When it is off duty, moreover, the expanding apparatus can be made compact as a whole by concealing the supporting plate 31 under the bottom portion of the casing 12.

The connector unit 71 mounted on the casing 12 comprises the connector holder 72 and the slider 74, which is attached to the holder by means of the operating portion for reciprocation, and the connector 81 on the side of the expanding apparatus 11 is attached to the slider. According to this arrangement, the connector 81 can be connected to or disconnected from the apparatus-side connector 6 by being reciprocated with respect to the compact electronic device on the expanding apparatus 11 by means of the operating portion. Thus, the connectors 6 and 81 can be easily connected to or disconnected from each other without moving the whole electronic device or manually operating the connector 81 itself. Moreover, the attachment and detachment do not require any wide working space. Furthermore, the impact on the connectors caused by the attachment or detachment work can be reduced.

Since the connector 81 is floatingly supported by means of the leaf springs 82 and 83, it can freely shift its position in a desired direction after it is brought into contact with the connector 6 which is to be connected thereto. If the apparatus-side connector 6 is somewhat deviated vertically or crosswise with respect to the connector 81, or if the angle of the connector 6 is more or less shifted, the connector 81 can be smoothly aligned with the connector 6 due to the floating structure. Thus, the two connectors 6 and 81 can be securely connected to each other by plug-in connection, so that the expanding apparatus can be adapted for use with various compact electronic devices.

The connector unit 71, which has the elastic fitting hooks 94 protruding from the lower surface of the connector holder 72, is attached to the casing 12 by removably engaging the hooks 94 with the edge of the fitting hole 18 of the casing. If the compact electronic device 1 is lifted with the two connectors 6 and 81 connected with each other, therefore, the hooks 94 undergo elastic deformation to be disengaged from the hole 18 of the casing 12, so that the unit 71 is automatically removed from the casing, when the disengaging force acting on the hooks 94 exceeds a predetermined level. Thus, the connected connectors can be prevented from being subjected to an overload.

In the embodiment described above, the operating portion for reciprocating the connector 81 to connect to or disconnect it from the connector 6 is not limited to the rocking handle 76, and may be formed of a handle fixed to the connector 81. In this case, the connectors 6 and 81 are connected or disconnected by reciprocating the handle together with the connector 81. In the above embodiment, moreover, the top wall 21a of the support block 21 is inclined so that the compact electronic device 1 mounted on the expanding apparatus 11 declines forward. Alternatively, however, the electronic device 1 may be mounted substantially horizontally by providing a pedestal portion in the vicinity of the retaining portions 35 of the supporting plate 31 so that the pedestal portion has substantially the same height as the top wall 21a. Alternatively, moreover, only the retaining portions 35 may be provided on the supporting plate 31 so as to be movable in the depth direction of the casing 12. In this case, the supporting plate 31 may be fixed to the casing or formed integrally therewith.

FIGS. 24 to 28 show a function expanding apparatus according to a second embodiment of the present invention. In the description of the second embodiment to follow, the same portions as are used in the first embodiment are designated by like reference numerals for simplicity, and the detailed description thereof will be omitted.

Figure 24:
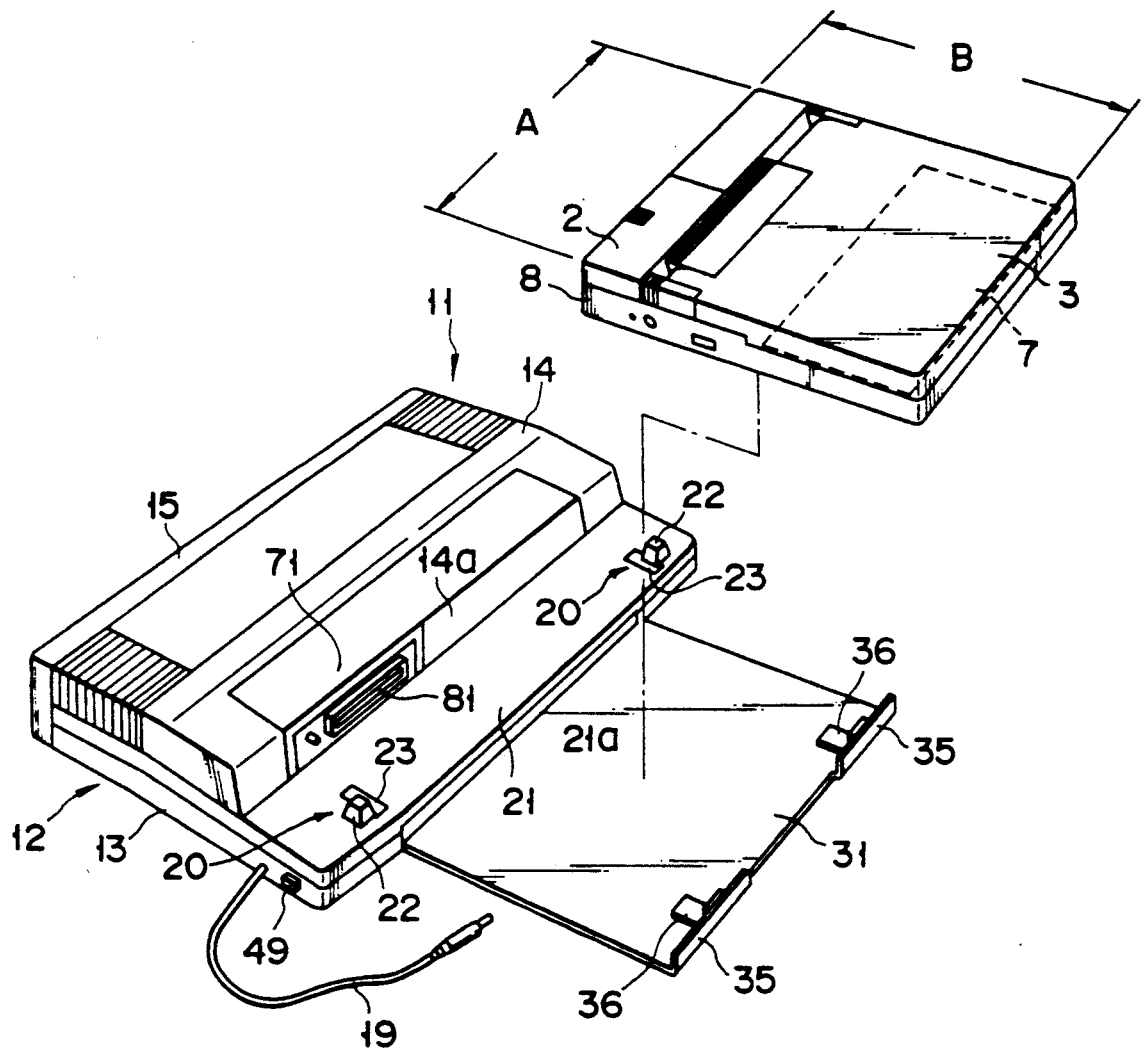

As shown in FIG. 24, the expanding apparatus comprises a supporting portion 21 formed in front of a casing 12. A top wall 21a of the supporting portion 21 is fitted with a pair of positioning members 20 for positioning a personal computer 1, for use as a compact electronic device, with respect to the width direction. The expanding apparatus further comprises a supporting plate 31 which extends forward from the casing 12. A pair of retaining portions 35 are provided on the front end of the plate 31. They are adapted to engage the the front edge of the computer 1 set on the supporting portion 21 and the plate 31. In this embodiment, the supporting plate 31 is immovably fixed to the casing 12. Alternatively, it may be formed integrally with the casing 12.

Figure 25:
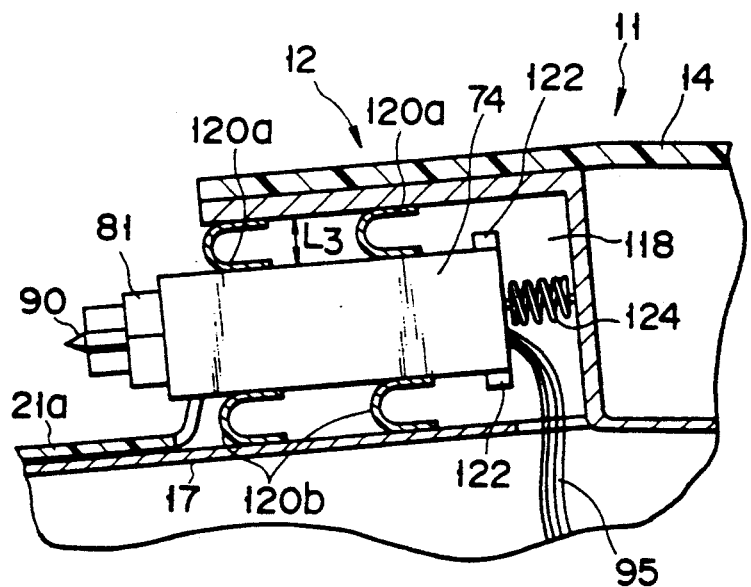
Figure 26:
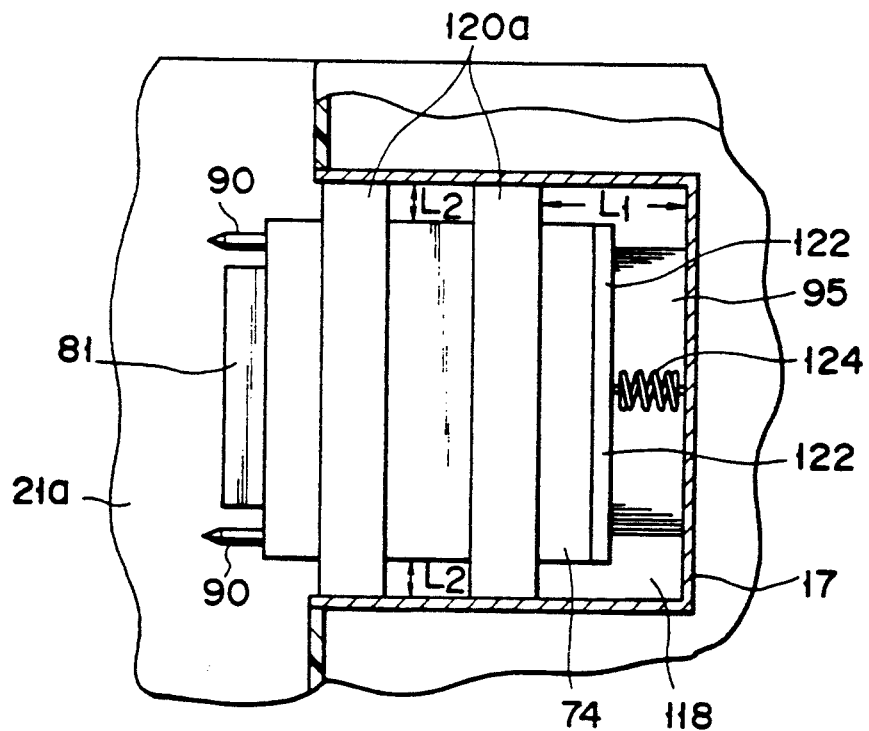

As shown in FIGS. 24 and 25, the casing 12 has a compartment 118 which opens to a step portion 14a of a cover 14 through a shield cover 17. A connector unit 71 is housed in the compartment 118. The unit 71 includes a slider 74, substantially in &he form of an angular tube, and a connector 6 fixedly arranged in the slider so that its extreme end portion projects forward from the slider. Two leaf springs 120a and 120b are fixed to each of those portions of the cover 17 which individually define the top and bottom faces of the compartment 118. Each of these spring is L-shaped and extends parallel to the step portion 14a. The slider 74 is supported in the compartment 118 in a manner such that it is elastically held between the springs 120a and 120b in the vertical direction.

Thus, the slider 74 is allowed to slide for a distance L1 (about 20 to 30 mm) in the depth direction of the casing 12 and for a distance L2 (about 5 to 10 mm) in the width direction of the casing, between the leaf springs 120a and 120b. By the elastic deformation of the springs 120a and 120b, moreover, the slider 74 is allowed to move for a distance L3 (about 5 to 10 mm) in the vertical direction.

A stopper 122, which extends substantially parallel to the leaf springs 120a and 120b, protrudes from each of the respective rear end portions of the upper and lower surfaces of the slider 74. These stoppers 122 are adapted to engage their corresponding springs 120a and 120b behind them, thereby preventing the slider 74 and a connector 81 from slipping out forward. A compression spring 124 is interposed between the rear face of the slider 74 and the shield case 17, thereby urging the slider forward.

The computer 1 is mounted on the function expanding apparatus with the aforementioned construction in the following manner.

First, the computer 1 is placed on the supporting portion 21 and the supporting plate 31 of the apparatus. In doing this, the respective rear portions of the two opposite side faces of the computer 1 individually abut against projections 22 of the positioning member 23, thereby positioning the computer crosswise with respect to the casing 12. Further, the computer 1 is positioned in the depth direction with respect to the retaining portions 35 of the supporting plate 31. Thus, as shown in FIG. 27, the computer 1 is mounted on the expanding apparatus 11 with its front edge in engagement with the retaining portions 35.

As described above, the connector 81, along with the slider 74, is moved vertically or in the width direction of the casing 12 so that it accurately faces the connector 6 of the computer 1, which is positioned in the width and depth directions with respect to the casing. Thereafter, the connector 81, along with the slider 74, is drawn out forward and plug-in-connected to the connector 6 of the computer 1.

If the computer 1 mounted on the expanding apparatus has a different depth B, e.g., shorter depth, the distance between the rear face of the computer and the connector unit 71 is longer. In this case, therefore, the connector 81 can be easily connected to the connector 6 of the computer 1 by increasing the distance of draw-out of the connector 81, as shown in FIG. 28.

According to the second embodiment arranged in this manner, the connector 81 of the connector unit 71 provided on the expanding apparatus is movable in substantially all directions, that is, vertically and in the width and depth directions. If the expanding apparatus is fitted with a compact electronic device of any other type with a different depth, therefore, the connector 81 and a connector of the electronic device can be easily connected to each other by moving the connector 81 back and forth. Also, any compact electronic device whose connector is mounted in a somewhat different position can be easily mounted by moving the connector 81 vertically or from side to side. Thus, there may be provided a function expanding apparatus which is applicable to various compact electronic devices.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A connector unit associated with an external apparatus to which an electronic device having a connector is connected, said connector unit comprising:
   a connector holder mountable to the external apparatus and including a pair of side walls facing each other, and a bottom wall connecting the side walls;
   a slider supported between the side walls of the connector holder for reciprocation in a predetermined direction;
   a connector body connected electrically to the external apparatus and situated between the slider and the bottom wall, the connector body being engaged the slider for movement along with the slider;
   means for supporting the connector body for movement in a direction substantially perpendicular to the predetermined direction, the supporting means having a first elastic member disposed between the connector body and the slider, and a second elastic member disposed between the bottom wall and the connector body, the connector body being held between the first and second elastic members; and
   operating means connected to the slider, for moving the slider in said predetermined direction between a retreated position and an advanced position in which the connector body is engageable to the connector of the electronic device.

2. A unit according to claim 1, wherein said slider has a through hole, and said connector body includes an engaging portion penetrating the first elastic member and fitted into the through hole.

3. A unit according to claim 2, which further comprises positioning means for positioning the connector body with respect to the slider.

4. A unit according to claim 3, wherein said positioning means includes a positioning portion formed in the through hole and means for urging the engaging portion of the connector body toward the positioning portion.

5. A unit according to claim 1, wherein said operating means includes a pair of rocking arms and a handle connecting the rocking arms, said rocking arms being rockably attached individually to the side walls of the connector holder and individually engaging the end portions of the slider so as to be rockable as the slider moves.

6. A unit according to claim 5, which further comprises means for locking said connector body to the advanced position.

7. A unit according to claim 6, wherein said locking means includes a locking member engageable with one of the arms to restrain the arm from rocking, when the connector body is moved to the advanced position.

8. A unit according to claim 1, which further comprises means for removably mounting the connector holder to a mountable portion of the external apparatus.

9. A unit according to claim 8, wherein said mounting means includes a plurality of fitting pieces protruding from the connector holder, for engaging the mountable portion, each said fitting piece being formed of a material capable of elastic deformation.

10. A connector unit associated with an external apparatus to which an electronic device having a connector is connected, said connector unit comprising:
   a connector holder removably mounted on the external apparatus;
   a slider supported on the connector holder for reciprocation in a predetermined direction;
   a connector body connected electrically to the external apparatus and engageable with the connector of the electronic device;
   means for supporting the connector body for movement in said predetermined direction together with the slider and for movement in a direction substantially perpendicular to said predetermined direction relative to the slider so as to align the connector body with the connector in said direction, the supporting means including a first elastic member and a second elastic member, the connector body being clamped between the first and second elastic members and slidable between the first and second elastic members, and the first elastic member, the connector body, and the second elastic member being arranged in this order in a direction substantially perpendicular to said predetermined direction; and
   operating means connected to the slider, for moving the slider in said predetermined direction between a retracted position and an advanced position in which the connector body is engageable with the connector of the electronic device connected to the external apparatus.

11. A connector unit associated with an external apparatus to which an electronic device, having a connector with a guide portion, is connected, said connector unit comprising:

a connector holder removably mounted on the external apparatus;

a slider supported on the connector holder for reciprocation in a predetermined direction;

a connector body connected electrically to the external apparatus and engageable with the connector of the electronic device;

means for supporting the connector body for movement in said predetermined direction together with the slider between a connecting position wherein the connector body is being connected to the connector and a disconnecting position wherein the connector body is being disconnected from the connector, and for movement in a direction substantially perpendicular to said predetermined direction relative to the slider;

a guide pin extending from the connector body in said predetermined direction, for engaging the guide portion of the connector so as to align the connector body with the connector, the guide pin being movable between an extended position and a retreated position, and means for urging the guide pin to the extended position and for allowing the guide pin to move to the retracted position when the guide pin is engaged the guide portion of the connector while the connector body is moved from the disconnected position to the connecting portion.

12. A connector unit associated with an external apparatus to which an electronic device having a connector which a guide portion is connected, said connector unit comprising:

a connector holder removably mounted on the external apparatus;

a slider supported on the connector holder for reciprocation in a predetermined direction;

a connector body connected electrically to the external apparatus and engageable with the connector of the electronic device; and means for supporting the connector body for movement in said predetermined direction together with the slider between a connecting position wherein the connector body is being connected to the connector and a disconnecting position wherein the connector body is being disconnected from the connector, and for movement relative to the slider in first and second directions which are substantially perpendicular to said predetermined direction and substantially perpendicular to each other;

the supporting means including a pair of engage holes formed in the slider; a pair of pins extending from the connector body in the first direction and passed through the engage holes, respectively, each of the engage holes having a holding section for holding the pin to prevent the movement of the pin relative to the slider in the second direction and a release section for allowing the pin to move in the second direction; and urging means connected between the slider and the connector body, for urging the connector body so that the pins are positioned in the holding sections of the engage holes when the connector body is at the disconnecting position and for allowing the connector body to move so that the pins are positioned in the release sections of the engage holes during the connector body moves from the disconnecting position to the connecting position.

13. A unit according to claim 12, wherein each of said engage hole is formed in a substantially rectangular shape and has a V-shaped front edge facing the connector and defining the holding section.

14. A unit according to claim 13, wherein each of the pins is formed in a cylindrical shape and has a diameter smaller than a width of the engage hole.

15. A unit according to claim 13, wherein said urging means includes a pair of tension springs stretched between the slider and the connector body, for urging the connector body in a direction wherein the pins abut against the V-shaped front edges.

* * * * *